H. S. EADES.
LATHE.
APPLICATION FILED FEB. 24, 1920.

1,399,199.

Patented Dec. 6, 1921.
3 SHEETS—SHEET 1.

INVENTOR
HERBERT S. EADES
BY
ATTORNEY

H. S. EADES.
LATHE.
APPLICATION FILED FEB. 24, 1920.

1,399,199.

Patented Dec. 6, 1921.

INVENTOR
HERBERT S. EADES.
BY
ATTORNEY

UNITED STATES PATENT OFFICE.

HERBERT S. EADES, OF PHILADELPHIA, PENNSYLVANIA.

LATHE.

1,399,199.  Specification of Letters Patent.  Patented Dec. 6, 1921.

Application filed February 24, 1920. Serial No. 360,621.

*To all whom it may concern:*

Be it known that I, HERBERT S. EADES, a citizen of the United States, and resident of Philadelphia, in the county of Philadelphia and State of Pennsylvania, have invented certain new and useful Improvements in Lathes, of which the following is a specification.

This invention relates to lathes of rugged construction designed particularly for operating on work of great dimensions, such as heavy ordnance pieces and the like.

In the embodiment of the invention shown, the lathe comprises a fixed head stock, a tail stock which may be clamped at numerous points on a skeleton bed formed on longitudinally extending shear bars, and whose center has further longitudinal adjustment within the tail stock itself, and one or more carriages movable along the entire length of the work, said carriage or carriages being mounted on similar bars and having a swiveled slide for supporting a movable tool block slide, which in turn supports one or more tool blocks slidable thereon. The carriage supports a self contained feeding mechanism for the tool block slide which can be operated by means of the mechanism used for feeding the carriage along the work. A steady rest is provided and is of such form that the carriage can be moved along the entire length of the work without causing an interference between the cutting tool and said steady rest.

The objects and advantages of the invention will be apparent from the following specification and claims when read in connection with the accompanying drawings in which—

In lathes of massive construction for handling work such as large ordnance pieces, it is advantageous to employ a construction which makes it unnecessary to have cast iron beds of great length which are difficult to cast and assemble and machine accurately. Furthermore, in time of conflict it is advantageous to be able to construct lathes of this class without the use of such elongated beds because of the amount of time necessary for their proper casting and subsequent machining.

My improved lathe is of such design that huge cast iron beds such as were formerly used are done away with. The bed of my improved lathe is of skeleton formation and consists of two pairs of longitudinally extending bars 1—1 and 2—2 which are secured at intervals along their length to transversely extending frames 3 which are preferably embedded in a concrete foundation 4, although it is to be understood that other suitable foundations of masonry would serve the same purpose.

Figure 4:
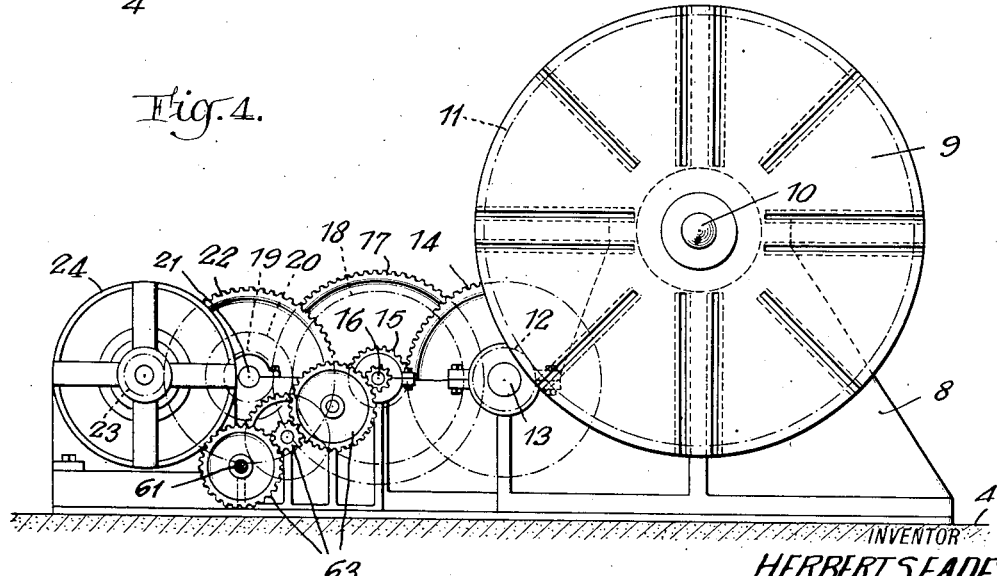
Fig. 4 is a transverse section on the line 4—4 of Fig. 1 illustrating the head stock and its associated driving mechanism.

The tail stock 5 is capable of being fixedly secured to the bars 1—1 at a number of desired points and the dead center 6 carried thereby is capable of slight endwise adjustment by manipulation of the gearing 7. The head stock 8 is fixedly anchored to the foundation 4 and comprises a face plate 9 carrying the usual live center 10 which is driven by gearing 11 meshing with a pinion 12, Fig. 4, carried on a counter-shaft 13 which shaft also carries a gear 14 mating with a driving pinion 15 on the speed change shaft 16. The shaft 16 carries gears 17 and 18 arranged to be engaged respectively by either of the sliding gears 19 or 20 carried by the transmission shaft 21. This shaft carries a gear 22 meshing with a driving pinion 23 on the armature shaft of a motor 24, of the variable speed type having a wide range of adjustable speeds, as for example, a 3 to 1, or 4 to 1 ratio.

Figure 1:
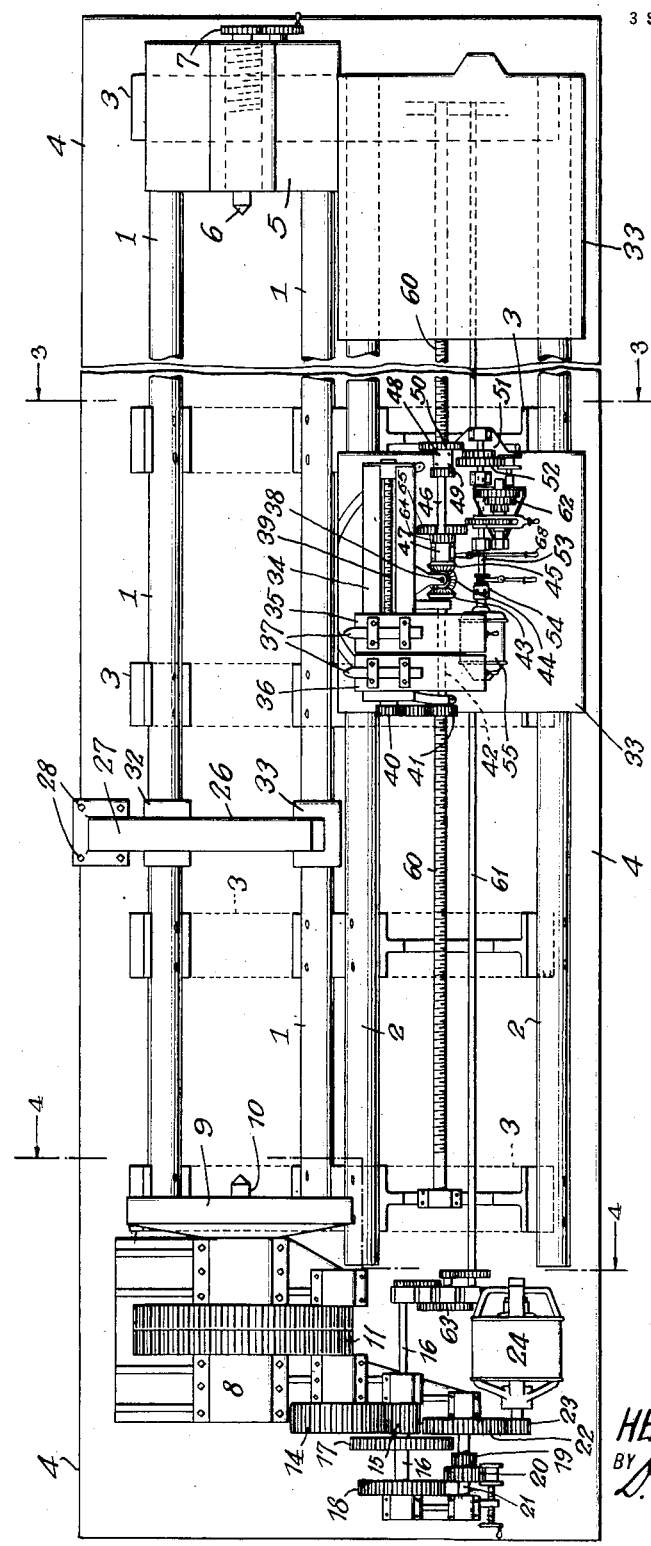
Figure 1 is a top plan view illustrating the general arrangement, a central portion being omitted for the sake of clearness.
Figure 2:
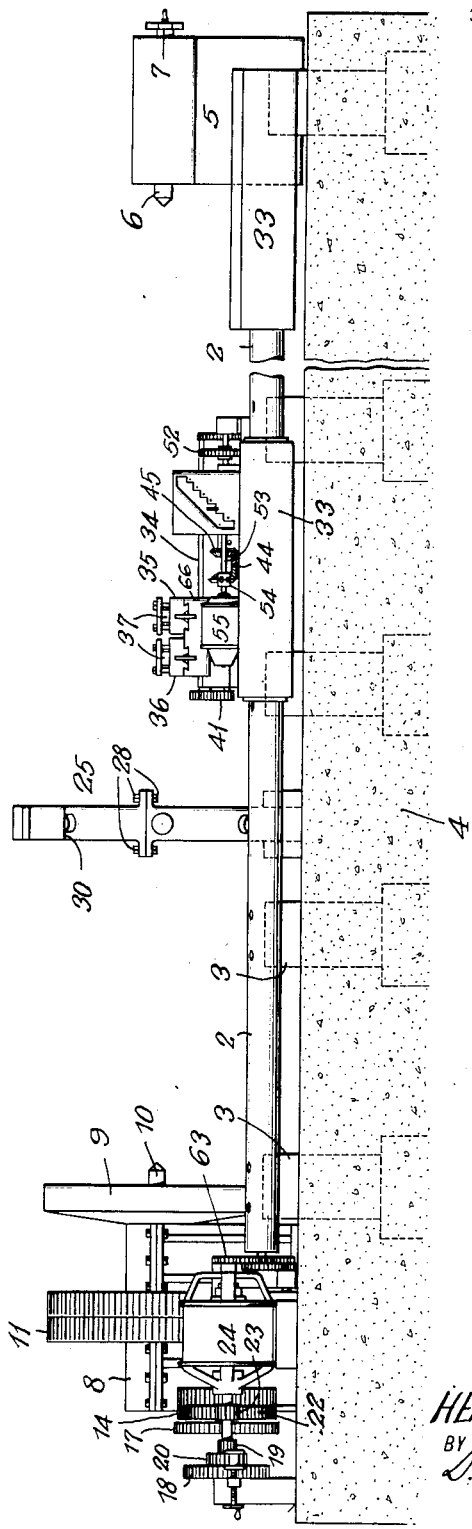
Fig. 2 is a side elevation on the same scale as Fig. 1.
Figure 3:
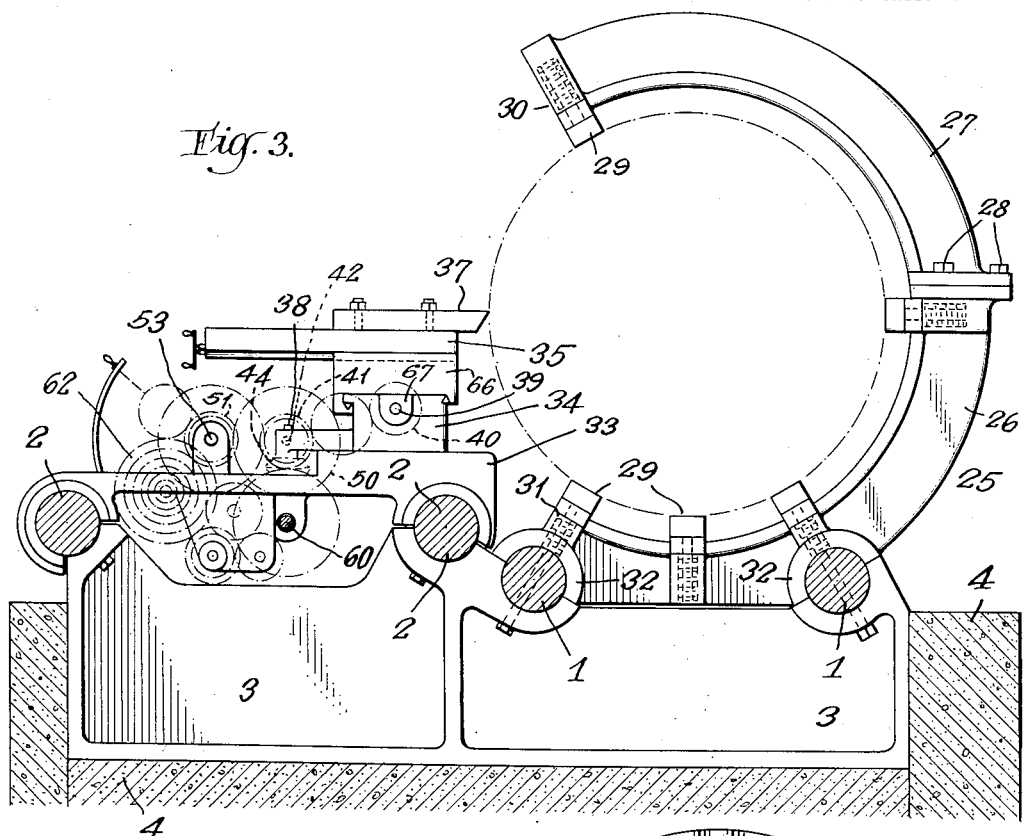
Fig. 3 is an enlarged section on the line 3—3 of Fig. 1 illustrating the steady rest and tool carriage, certain gearing on the tool carriage being indicated diagrammatically.

The steady rest 25 shown in Fig. 3 forms one of the features of the invention, and consists of a curved arm having a lower section 26 and an upper section 27 secured thereto by bolts 28, said arm being provided with adjustable centering devices 29 so as to accurately aline the work. The upper arm 27 terminates at 30 and the lower arm at 31, leaving an open space of generous dimension between the ends of the two arms, thereby giving ample clearance for the passage of the cutting tool along the entire length of the work. The steady rest is provided at its lower side with hubs 32 which engage the shear bars 1—1 to which the steady rest is securely fastened.

The lathe is equipped with two carriages 33—33 embodying novel features. The construction of each carriage is identical, therefore, the detailed description and illustration of one will suffice for both.

Each carriage 33 is provided with a swiveled main slide 34 carrying a tool block slide 66 on which are mounted tool blocks 35 and 36, to which are secured turning tools 37. Each slide 34 is swiveled on a vertical axis 38. When the slide 34 is adjusted about its axis 38 it is clear that the cutting tools 37 can be fed at an angle to the axis of the work for taper turning. The length of the slide 34 in the machine illustrated is approximately five feet, thereby enabling considerable taper work to be done on the piece without moving the carriage to a new position. The slide 34 is equipped with a feed screw 39 which engages a suitable nut 67, secured to the underside of the tool block slide 66 whereby the tool block slide is moved along the slide 34. The feed screw 39 carries on one end a pinion 40 which is driven through an idler by a gear 41 carried on the end of a shaft 42 supported in brackets secured to the slide 34. On the opposite end of the shaft 42 is a bevel gear 43 which mates with a similar gear 44 mounted on the axis 38 of the slide. The gear 44 is driven by a similar bevel gear 45 carried by a shaft 46 mounted in suitable bearings 47 and 48, secured to the carriage 33. The shaft 46 carries gears 49 and 50 which may be engaged with either of the sliding gears 51 and 52 splined on a shaft 53 which is connected both by a clutch 54 to the armature shaft of a motor 55, and by a train of tumbler change gears designated in general as 62, through an idler to a gear splined on shaft 61 running the length of the lathe underneath the carriages, which shaft in turn derives its motion through a train of gears 63 driven through shaft 16. Thus when speed change gearing 62 is put into a neutral position and clutch 54 is engaged, rapid traverse through the relatively quick acting motor 55 is transmitted to screw 39, thus permitting a prompt shifting of tool block slide 66 to any desired position on slide 34. On the other hand, when a relatively slow continuous feed of the tool blocks is desired (as during actual cutting operations) clutch 54 is disengaged and suitable members of gear train 62 engaged, thus transmitting any desired cutting feed within the limits of the machine to the tool blocks. When bevel gears 44 and 45 are in mesh it is apparent that slide 34 may be moved about its axis 38 so as to be set for taper turning and still maintain the driving connection to screw 39 through gear 43 rolling on its mating gear 44.

When the lathe is to be operated for straight turning, the tool block slide 66 remains fixed on slide 34, and a lever 68 moves bearing 47 so as to throw bevel gears 44 and 45 out of mesh and spur gears 64 and 65 into mesh. Gear 65, held in suitable bearings integral with under side of carriage 33 is tapped to fit stationary lead screw 60. As in the case of the feed to tool block slide 66, the rotation of combined gear and feed nut 65 is obtainable either through motor 55 or through gearing 62, shaft 61 and gearing 63, thus giving carriage 33 either power rapid traverse along the bed or various feeds along the bed for cutting respectively.

By the use of two carriages 33, each equipped with mechanism for tapered turning, it is clear that tapers of two different angles may be turned simultaneously on a single piece of work, or the tools on one carriage may be utilized for making a roughing cut, while the tools on the other carriage follow along and make a finishing cut, thereby effecting a material saving of time in turning out a given piece of work, or the tools on one carriage may be turning taper while those on the other carriage are doing ordinary plain turning. The advantages of such an arrangement will be clear to those skilled in the art of cutting metals.

As it is clear that changes in design and arrangement, and the substitution of mechanical equivalents may be made by those skilled in the art, the matter described herein and shown in the accompanying drawings is to be interpreted in an illustrative and not a limiting sense.

I claim:—

1. In a lathe, a carriage movable longitudinally in front of the work, a main slide movable relatively to said carriage about a vertical axis, a tool block slide, slidably mounted on said main slide, a motor carried by said carriage, connections between said motor and said tool block slide for rapidly feeding the latter along the slide, and connections between said tool block slide and main cutting feed mechanism for feeding said tool block slide along said main slide.

2. In a lathe, a carriage movable longitudinally in front of the work, a main slide movable relatively to said carriage about a vertical axis, a tool block slide slidably mounted on said main slide, a rapid traverse motor and slow feed mechanism carried by said carriage, a feed screw carried by said main slide for moving said tool block slide, a bevel gear mounted on the axis of said main slide, gears mating with said bevel gear and connections with said motor, said feed mechanism and said feed screw, whereby motion is transmitted to said tool block slide for taper turning, regardless of its angular position.

3. A lathe including a head stock, a tail stock, a carriage mounted for longitudinal movement in a line parallel with the work held between the centers of said head and tail stocks, a main slide movable relatively to said carriage about a vertical axis, a tool block slide movable relatively to said main slide, a tool block mounted on the tool block slide, a motor and power transmitting devices carried by the carriage for moving said tool block slide along the main slide.

4. A lathe including a head stock, a tail stock, a carriage mounted for longitudinal movement in a path parallel with the axis of the work held between the centers in said head and tail stocks, a main slide supported by said carriage and movable about a vertical axis thereon, a tool block slide movable along said main slide, a tool block carried by said tool block slide, and a motor and connections carried by said carriage for moving said tool block slide along said main slide.

5. A lathe having a plurality of carriages movable along the length of the work, each carriage having a main slide mounted thereon for adjustment about a vertical axis, and each main slide having a longitudinally movable tool block slide mounted thereon, carrying tool blocks and tools whereby a plurality of tapers of either the same or different angles may be simultaneously turned on the same piece of work, motors and feed mechanism carried by said carriages and transmission devices operatively connected with said motors and feed mechanism for independently driving each of said tool block slides along said main slides.

In witness whereof, I have hereunto set my hand.

HERBERT S. EADES.